United States Patent
Singh et al.

(10) Patent No.: US 10,173,796 B2
(45) Date of Patent: *Jan. 8, 2019

(54) NAKED COLLATION PACKAGE

(71) Applicant: INNOVIA FILMS, LTD., Wigton, Cumbria (GB)

(72) Inventors: Shalendra Singh, Wigton (GB); Michael Jeschke, Wigton (GB)

(73) Assignee: INNOVIA FILMS, LTD, Wigton, Cumbria (GB)

(*) Notice: Subject to any disclaimer, the term of this patent is extended or adjusted under 35 U.S.C. 154(b) by 80 days.

This patent is subject to a terminal disclaimer.

(21) Appl. No.: 13/666,665

(22) Filed: Nov. 1, 2012

(65) Prior Publication Data

US 2013/0056382 A1 Mar. 7, 2013

Related U.S. Application Data

(63) Continuation of application No. 12/671,763, filed as application No. PCT/GB2008/050662 on Aug. 4, 2008.

(30) Foreign Application Priority Data

Aug. 23, 2007 (GB) .................................. 0716457.7

(51) Int. Cl.
    *B65D 71/12* (2006.01)
    *B65B 11/48* (2006.01)
    (Continued)

(52) U.S. Cl.
    CPC .............. *B65B 11/48* (2013.01); *B32B 27/08* (2013.01); *B32B 27/32* (2013.01); *B32B 2439/70* (2013.01)

(58) Field of Classification Search
    CPC ..... B65B 11/48; B65D 85/1072; B65D 65/40; B65D 75/002; B65D 75/26
    (Continued)

(56) References Cited

U.S. PATENT DOCUMENTS 4,252,851 A    2/1981    Lansbury et al.
5,097,955 A *    3/1992    Kluter et al. ................. 206/497
(Continued)

FOREIGN PATENT DOCUMENTS

CA    1156602    11/1983
DE    1 694 694    8/1971
(Continued)

OTHER PUBLICATIONS

WIPAK, Walothen CT 25 DW—Innovation in Direct Bundle Wrapping, advertisement in Tobacco Journal International, Jun. 2007.
(Continued)

*Primary Examiner* — Robert Poon
(74) *Attorney, Agent, or Firm* — Ping Wang; Morris, Manning & Martin, LLP (57) ABSTRACT

The invention generally relates to a naked collation package comprising an arrangement of individual packages, individually packaged in a polyolefinic filmic material, that are packed together in said naked collation package in a naked collation film, and there being no seal between the naked collation film and the filmic material of the individual packages. A method for forming the naked collation package and a method for manufacturing the naked collation package are also disclosed.

21 Claims, 1 Drawing Sheet

(51) Int. Cl.
  *B32B 27/32* (2006.01)
  *B32B 27/08* (2006.01)

(58) Field of Classification Search
  USPC ............... 53/461; 206/497, 242, 256, 271; 428/516; 229/87.13
  See application file for complete search history.

(56) References Cited

U.S. PATENT DOCUMENTS

| | | | |
|---|---|---|---|
| 5,792,549 | A | 8/1998 | Wilkie |
| 5,898,050 | A | 4/1999 | Shih et al. |
| 5,900,284 | A | 5/1999 | Hu |
| 5,900,294 | A | 5/1999 | Murschall et al. |
| 6,244,017 | B1 * | 6/2001 | Focke ............... B65D 85/1072 53/147 |
| 6,358,579 | B1 | 3/2002 | Peiffer et al. |
| 6,451,426 | B2 | 9/2002 | Kong et al. |
| 6,491,161 | B1 * | 12/2002 | Focke et al. ............... 206/264 |
| 6,887,582 | B2 | 5/2005 | Lee et al. |
| 6,908,687 | B2 | 6/2005 | Mendes et al. |
| 6,979,495 | B2 * | 12/2005 | Keung et al. ............... 428/476.1 |
| 2002/0012803 | A1 * | 1/2002 | Kending ............... 428/423.7 |
| 2003/0099851 | A1 | 5/2003 | Mount, III et al. |
| 2004/0007319 | A1 | 1/2004 | Squier et al. |
| 2004/0048081 | A1 | 3/2004 | Hewitt et al. |
| 2007/0023301 | A1 * | 2/2007 | Pham ............... 206/264 |

FOREIGN PATENT DOCUMENTS

| | | |
|---|---|---|
| DE | 36 35 928 A1 | 4/1988 |
| DE | 3635928 | 4/1988 |
| EP | 0 488 179 A1 | 6/1992 |
| EP | 0622186 A1 | 11/1994 |
| EP | 0622187 A1 | 11/1994 |
| EP | 0 645 417 A1 | 3/1995 |
| EP | 0645417 | 3/1995 |
| EP | 0 849 073 A2 | 6/1998 |
| EP | 0849073 | 6/1998 |
| EP | 0 956 947 A2 | 11/1999 |
| EP | 1 053 278 B1 | 11/2000 |
| EP | 1 055 515 A2 | 11/2000 |
| EP | 1053278 | 11/2000 |
| EP | 1055515 | 11/2000 |
| EP | 1 431 028 A1 | 6/2004 |
| EP | 1431028 | 6/2004 |
| EP | 1500680 | 1/2005 |
| EP | 0963408 B1 | 5/2006 |
| EP | 1655341 | 5/2006 |
| EP | 1837282 | 9/2007 |
| EP | 1 840 029 A2 | 10/2007 |
| EP | 1840029 | 10/2007 |
| WO | 92/00344 A1 | 1/1992 |
| WO | 95/23697 A1 | 9/1995 |
| WO | 99/41300 | 8/1999 |
| WO | 99/41300 A1 | 8/1999 |
| WO | 1999 41300 | 8/1999 |
| WO | 01/15994 | 3/2001 |
| WO | 2001 15994 A1 | 3/2001 |
| WO | 01/49487 A1 | 7/2001 |
| WO | 03/089336 | 10/2003 |
| WO | 2003089336 A1 | 10/2003 |
| WO | 04/003874 A2 | 1/2004 |
| WO | 2005/007537 | 1/2005 |
| WO | 2005/007537 A1 | 1/2005 |
| WO | 2006/063905 | 6/2006 |
| WO | 2009/024810 | 2/2009 |

OTHER PUBLICATIONS

WIPAK Partner in Packaging, The Perfect Mix for Tobacco Industry, 6 pages.
WIPAK, Provisional Technical Data, Walothen CT 25 DW, Nov. 2006.
Walothen CT 25 DW, advertisement in Tobacco Journal International, Apr./May 2006.
Tobacco Journal International, Capacities shift to the east, Jan. 2007.
Polo Films, Polo BSA L92, revision Jun. 2007.
Grounds of Oppositions by Treofan Germany GmbH & Co. KG mailed Dec. 21, 2012.
Grounds of Oppositions by Terichem, a.s. mailed Dec. 17, 2012.
Grounds of Oppositions by Philip Morris Products S.A. mailed Dec. 21, 2012.
Grounds of Oppositions by IRPLAST S.p.A. mailed Dec. 19, 2012.
International Preliminary Report on Patentability issued in International Patent Application No. PCT/GB2008/050662 dated Feb. 24, 2010.
International Search Report and Written Opinion issued in International Patent Application No. PCT/GB2008/050662 dated Feb. 12, 2008.
British Search Report issued in British Patent Application No. 0716457.7 dated Jan. 22, 2008.
British Search Report issued in British Patent Application No. 0716457.7 dated Jan. 24, 2008.
Sperlich, B., Affirmation email regarding "CT 25 DW und Patent EP 1 840 029", dated Dec. 17, 2012, pp. 1.
Walothen CT 25 DW/V20 analysis, Oct. 26, 2009, pp. 1.
Test report (Testbericht D6) dated Nov. 26, 2012, pp. 1-38.
WIPAK E-Magazine "Low Temperature sealing BOPP film reduces bundle wrap costs—Direct Bundle Wrap", Mar. 2006.
Wipak E-Magazin Mar. 2006.
Tobacco Journal International "Capacities shift to the east".
WIPAK The Perfect Mix for Tobacco Industry DE Jun. 2007.
Publication in Tobacco Journal International (Apr./May 2006).
Advertisement in Tobacco Journal International (Jun. 2007).
Wipak-Walothen CT 25 DW datasheet.
Polo Films Polo BSA L92 Jun. 2007.
Standard test Method for Tensile Properties of Thin Plastic Sheeting; ASTM International.

* cited by examiner

NAKED COLLATION PACKAGE

This application is a continuation application of U.S. patent application Ser. No. 12/671,763, filed on Feb. 2, 2010, which is 371 national stage application of International Patent Application Serial No PCT/GB2008/050662, filed on Aug. 4, 2008, which claims priority of British Patent Application No. 0716457.7 filed on Aug. 23, 2007. The entirety of all of the aforementioned applications is incorporated herein by reference.

FIELD

The present invention relates to a naked collation package and to a method for its manufacture.

BACKGROUND

U.S. Pat. No. 6,887,582 discloses a polyolefin multi-layer film for cold seal cohesive applications, including a first polyolefin skin layer comprising a blend of ethylene propylene random copolymer and metallocene catalysed plastomer.

U.S. Pat. No. 6,451,426 discloses a sealable film used for packaging, particularly in the form of bags, comprising an olefin polymer layer and a sealing layer, and a separable block copolymer layer therebetween to provide peelability.

U.S. Pat. No. 5,898,050 discloses a polyolefin composition for preparing a polyolefin film having heat sealing properties.

U.S. Pat. No. 5,792,549 discloses a coextruded biaxially oriented polyolefin packaging film having a cold seal release layer, a core layer and a cold seal receptive skin layer.

EP-B-0963408 discloses an oriented coextruded multi-layer film for heat shrinkable packaging comprising a copolyethylene outer layer coextruded with a polypropylene core layer.

U.S. Pat. No. 6,979,495 discloses a biaxially oriented multilayer film comprising a core layer of syndiotactic polypropylene homopolymer and at least one additional layer adjacent the core layer comprising a polymer which is an ethylene or a propylene homopolymer, ethylene copolymer or terpolymer containing comonomers of propylene and/or butane-1.

WO-A-01/49487 discloses a multilayer polymeric film for packing cassette tapes, comprising a core layer containing polypropylene, polymeric modifier containing polyolefin(s), and hydrocarbon resin between a pair of skin layers.

U.S. Pat. No. 6,908,687 discloses a heat shrinkable polymeric film for use in label applications comprising a shrink control layer including a blend of primary polymeric component and modifier component comprising ethylene plastomer, polypropylene plastomer or ethylene/propylene copolymer.

WO-A-04/003874 discloses a machine direction oriented polymeric film for adhesive labels comprising polypropylene homopolymers and/or copolymers having preset melt flow rates, and olefin elastomers.

EP-B-0622187 discloses a biaxially oriented polypropylene film having a polypropylene base layer and an outer layer containing polypropylene homo-, co, or ter-polymer and HDPE or a blend to provide shrinkage characteristics.

EP-B-0622186 discloses biaxially oriented polypropylene films for shrink wrapping, having a polypropylene base layer and outer layer(s) containing an olefin co- or terpolymer and HDPE.

WO-A-03/089336 discloses a method of packing packets of cigarettes wherein an ordered group of individual packets is packed solely in a sheet of transparent heat-seal plastic packing material, which is folded about the ordered group to form a tubular wrapping. A girth seal is then provided to seal the tube, and envelope seals at each end of the package. This type of packaging is known in the art as naked collation, because the individual packets are packaged only in the film and not in, for example, a larger box which is then wrapped in the film. Shrink naked collation refers in the art to this type of package wherein the film is shrinkable to wrap more tightly the collated packets once sealed.

U.S. Pat. No. 6,358,579 discloses another naked collation type packaging wherein the packaging film is a polyolefin film with modified polyolefinic sealable layers. The sealable outer layers comprise copolyester and the combined film is to seal to itself, but not to the biaxially oriented polypropylene films of the individual packages.

A multipack system in which individual packaging takes place in a biaxially stretch-oriented polypropylene film having modified polyolefinic heat-sealing layers is disclosed in DE3635928.

EP 1431028 discloses a polypropylene film or laminate, in which if the film/laminate is heat-sealable the inside of the film is coated locally with heat-resistant varnish over areas affected by sealing, whereas if the film/laminate is not heat-sealable a heat-sealable varnish is applied to the sealing points.

DETAILED DESCRIPTION

The present invention is primarily concerned with overwrap films for naked collation. Naked collation is an effective way to reduce packaging costs and materials. When a number of individually packaged articles (cigarette packs, for example) are to be grouped together and packaged as a larger bundle for distribution or for bulk retail, it is usual for the individual packages to be placed in a larger box or carton, before then being wrapped. Naked collation eliminates the need for the box or carton. However, one of the problems of naked collation in film wrapping is that in generating the collated package it is necessary to seal the film package. This raises the prospect of the collated package film sealing not only to itself but also to the film used to wrap each individual packet. In the cigarette industry, wherein the individual packs tend to be wrapped in polypropylene film, this is a particular problem. The manufacturer would often prefer to use polypropylene film for its collated bundle, taking advantage of the favorable optical and mechanical properties of such films, but in that case risks sealing the collation film also to the film of the individual packs. Such problems have in the past been addressed by providing the polypropylenic overwrap film for naked collation with an acrylic coating, which seals well to itself but not to the polypropylene wrapping of the individual packs. However, acrylic coatings add cost to the film manufacturing process, both in terms of the material used to provide the coating and, perhaps more importantly, in necessitating a coating operation following extrusion of the film.

It is an object of the present invention to provide an improved naked collation film in polyolefin packaging, in particular one which avoids the need for an acrylic coating.

According to the present invention there is provided a method for forming a naked collation package comprising:
providing an arrangement of packages individually wrapped in a filmic polyolefinic material; providing a naked collation film for nakedly wrapping said individually wrapped packages, the naked collation film comprising a polyolefinic core layer C, a polyolefinic inner sealing layer A on the inner surface of the naked collation film and a polyolefinic outer sealing layer B on the outer surface of the naked collation film, the polyolefinic material of the inner sealing layer A being selected for sealing incompatibility with the filmic polyolefinic material of the individually wrapped packages under a specified sealing condition, and the polyolefinic material of the outer sealing layer B being selected for sealing compatibility with B and for sealing compatibility with A under the selected sealing condition;

arranging the individually wrapped packages in an ordered configuration in contact with polyolefinic sealing layer A of the naked collation film;

wrapping the naked collation film around the ordered configuration of individually wrapped packages to form a film tube with overlapping edges;

forming a girth seal by sealing together the overlapping edges of the film tube, without sealing inner sealing layer A to the filmic polymeric material of the individually wrapped packages; and forming envelope seals at each end of the package by folding in the film tube and sealing the folded ends, without sealing inner sealing layer A to the filmic polymeric material of the individually wrapped packages.

Preferably the girth seal is formed A to B. The envelope seals may be formed B to B and/or A to B and/or A to A, and combinations of two or more thereof.

Preferably the external surface of the filmic polyolefinic material of the individually wrapped packages comprises at least one polyolefinic component derived from a monomeric olefin having a carbon chain length x, and the polyolefinic material of the inner sealing layer A comprises at least one polyolefinic component derived from a monomeric olefin having a carbon chain length y, y being different from x. More preferably, the polyolefinic material of the outer sealing layer B also comprises at least one polyolefinic component derived from a monomeric olefin having a carbon chain length y. Thus, in the case where the surface polyolefinic material of the individually wrapped packages comprises a polyethylenic component, the polyolefinic material of the inner sealing layer A preferably comprises a polypropylenic component and/or a polybutylenic component. Preferably in this case the polyolefinic material of the outer sealing layer B also comprises a polypropylenic component and/or a polybutylenic component. In the case where the surface polyolefinic material of the individually wrapped packages comprises a polypropylenic component, the polyolefinic material of the inner sealing layer A preferably comprises a polyethylenic component and/or a polybutylenic component. Preferably in this case the polyolefinic material of the outer sealing layer B also comprises a polyethylenic component and/or a polybutylenic component. In the case where the surface polyolefinic material of the individually wrapped packages comprises a polybutylenic component, the polyolefinic material of the inner sealing layer A preferably comprises a polyethylenic component and/or a polypropylenic component. Preferably in this case the polyolefinic material of the outer sealing layer B also comprises a polyethylenic component and/or a polypropylenic component.

For the avoidance of doubt, it is mentioned that when the external surface of the filmic polyolefinic material of the individually wrapped packages comprises at least one polyolefinic component derived from a monomeric olefin having a carbon chain length x, and the polyolefinic material of the inner sealing layer A comprises at least one polyolefinic component derived from a monomeric olefin having a carbon chain length y, y being different from x, the polyolefinic material of the inner sealing layer A may additionally comprise at least one polyolefinic component derived from a monomeric olefin having a carbon chain length x. In this case, the polyolefinic material of the inner sealing layer A comprises at least two polyolefinic components, one being derived from a monomeric olefin having a carbon chain length y and the other being derived from a monomeric olefin having a carbon chain length x. The polyolefinic material of the outer sealing layer B may also additionally comprise at least one polyolefinic component derived from a monomeric olefin having a carbon chain length x, in which case the polyolefinic material of the outer sealing layer B also comprises at least two polyolefinic components, one being derived from a monomeric olefin having a carbon chain length y and the other being derived from a monomeric olefin having a carbon chain length x. It is also contemplated within the scope of the invention to provide a sealing layer and/or a filmic polyolefinic material having a polymeric component derived from plural monomeric sources (for example a polypropylene/polyethylene random or block copolymer, and/or a blend of polypropylene and polyethylene), in which case provided that the sealing layer is derived from at least one monomeric component which has a different chain length from at least one monomeric originating component of the filmic polyolefinic material, then the condition of the invention is realized. It will be appreciated that in this case the filmic polyolefinic material and the material of the sealing layer may consist of or comprise the same polyolefinic material, for example a block or random copolymer or blend derived from plural monomeric sources wherein at least one monomeric source (for example ethylene) is of different chain length from at least one other monomeric source (for example propylene).

Preferably both x and y are from 2 to 4, although x and y must be different in this embodiment of the invention.

Accordingly, the invention provides a means for forming a naked collation package in which the naked collation film is rendered incompatible (for sealing purposes at the sealing condition) with the polyolefinic (especially polypropylenic) material wrapping the individual packets. The naked collation film has sealing compatibility with itself (A to B, A to A and/or B to B) at the sealing condition but is sealingly incompatible (at the sealing condition) with the filmic polyolefinic material of the individually wrapped packages. One way in which such sealing incompatibility can be provided is by providing in at least the inner sealing layer of the naked collation film at least one polyolefinic material derived from a monomer of different chain length from a monomer from which at least one polyolefinic material in the filmic material of the wrapped individual packages is derived. Another suitable way of achieving such sealing compatibility is to select the material of at least the inner sealing layer (and/or the outer sealing layer) to have a low seal threshold, at which the sealing layer will be sealingly compatible with itself at the sealing condition and/or with the other sealing layer of the naked collation film, but will be sealingly incompatible under that condition with the polyolefinic filmic material of the wrapped individual packages. In this case the naked collation film is designed to have a very low seal initiation characteristic because it is formed from at least one polymer having a low heat seal threshold. Sealing at a low temperature prevents the naked collation film from sticking to the unit wraps.

Accordingly, the invention provides a method as hereinbefore described for forming a naked collation package in which the polymeric material of the inner and/or outer sealing layer comprises at least one polyolefinic component having a low heat seal threshold.

By "low heat seal threshold", it is preferably meant that the sealing layer comprising the polyolefinic material having the low heat seal threshold will seal to itself and/or to the other sealing layer of the naked collation film at a temperature of less than 135° C., preferably less than 130° C., more preferably less than 125° C., still more preferably less than 120° C., even more preferably less than 115° C. and most preferably less than 110° C. when subjected to a sealing condition of for example 5 psi at a 0.2 s dwell time. The sealing condition in forming the naked collation package of the invention may be selected to correspond the said sealing temperature, or to be greater than it, provided that the sealing condition is not selected to be so great that sealing between the inner sealing layer of the naked collation film and the polyolefinic filmic material of the wrapped individual packages will begin to occur. The heat seal strength of the inner sealing layer to itself and/or to the outer sealing layer at the selected sealing condition is preferably above 100 g/25 mm, more preferably above 200 g/25 mm, still more preferably above 300 g/25 mm and most preferably above 400 g/25 mm.

The heat seal threshold of the or each sealing layer of the naked collation film to itself and/or to the other sealing layer of the naked collation film should in any event be lower than the heat seal threshold of the said sealing layer to the polyolefinic filmic material of the unit wraps, preferably substantially lower, for example at least about 5° C. lower, preferably at least about 10° C. lower, more preferably at least 15° C. lower. At the selected sealing condition the seal strength of the or each sealing layer of the naked collation film to itself and/or to the other sealing layer of the naked collation film should be higher than the seal strength of the said sealing layer to the polyolefinic filmic material of the unit wraps, preferably substantially higher, for example at least about 50 g/25 mm higher, preferably at least about 100 g/25 mm higher, more preferably at least about 150 g/25 mm higher.

By "sealing incompatibility" or "sealingly incompatible", it is preferably meant that the seal strength at the sealing condition is less than 100 g/25 mm, preferably less than 80 g/25 mm, more preferably less than 60 g/25 mm, still more preferably less than 40 g/25 mm, yet more preferably 30 g/25 mm, even more preferably less than 20 g/25 mm and most preferably less than 10 g/25 mm, or even less than 5 g/25 mm, or close to 0 g/25 mm or zero.

The sealing layer of the film may optionally be corona discharge treated, or treated in some other way further to enhance the sealing incompatibility between the sealing layer and the filmic polyolefinic material.

The filmic polyolefinic material may be of any known construction, including monolayer and multilayer, but in order to inform the selection of the polyolefinic material of the inner sealing layer A for sealing incompatibility with the filmic material it is generally only necessary, or primarily necessary, to consider only the external outer later of the filmic polyolefinic. In this sense "sealing incompatibility" refers to a substantial absence of sealing at the selected sealing condition between the inner sealing layer A and the external outer surface of the filmic polyolefinic material of the individually wrapped packages.

Figure 1:
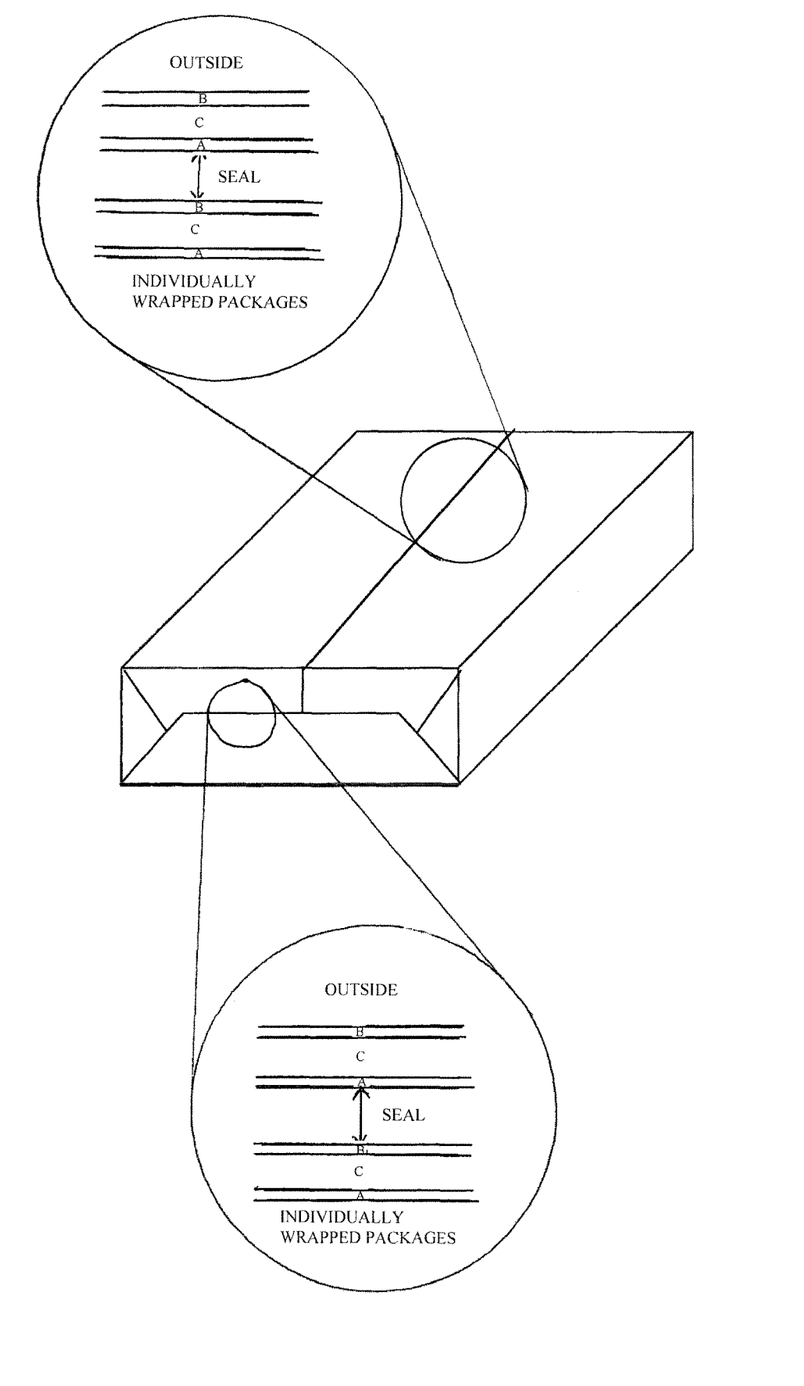
FIG. 1 is a diagram showing the layer structures at the girth seal and envelope seal of an embodiment of a naked collation package.

The invention also provides a naked collation package comprising an arrangement of individual packages, individually packaged in a polyolefinic filmic material, that are packed together in said naked collation package in a naked collation film, wherein the naked collation film comprises a sealable polyolefin film having a polyolefinic core layer C, an polyolefinic inner sealing layer A and a polyolefinic outer sealing layer B, the polyolefinic material of the inner sealing layer A being selected for sealing incompatibility with the filmic polyolefinic material of the individual packages under a specified sealing condition, and the polyolefinic material of the outer sealing layer B being selected for sealing compatibility with B and for sealing compatibility with A under the selected sealing condition, the individual packages being arranged in an ordered configuration inside the package and with the naked collation film wrapped around the ordered configuration of individual packages and sealed to itself (A to B) at a girth seal, and sealed to itself (B to B and optionally A to B and/or A to A) at envelope seals at each end of the package, there being no seal between the naked collation film and the filmic material of the individual packages. FIG. 1 shows the layer structures at the girth seal and envelope seal of an embodiment of the naked collation package.

The sealing condition may be selected by the assembler of the naked collation package and will generally comprise conditions of elevated temperature and/or pressure and a dwell time for the sealing operation. Typically the sealing temperature will be above 80° C., for example above 85° C., or even above 90° C.

Sometimes seal temperatures in excess of 95° C. or even 100° C. may be used.

Typically it is desirable for the sealing temperature to be below a certain level also. An excessive sealing temperature may cause sealing of the naked collation film to the individual packages. Generally the sealing temperature will be below 200° C., more often lower, such as below 175° C., below 150° C. or below 140° C.

Usually it is preferable for the sealing temperature not to exceed 130° C. The sealing pressure will typically be above 2 psi, often between about 5 psi and 25 psi for example. Dwell times may be selected in accordance with well known principles and will generally be from at least about 0.05 s to about 2 s, for example from 0.075 s to about 1 s, preferably from about 0.1 s to about 0.5 s. The sealing layers are preferably formed as coat layers, or coatings, on opposite surfaces of the core layer C. These layers may be formed by coextrusion with the core layer, by the subsequent application of one of more coats onto the surface of the already formed core layer, by extrusion coating, or by a combination thereof. Generally it is preferred that the sealing layers be coextruded together with the core layer in manufacture of the naked collation film.

The sealing layers will generally comprise one or more polyolefinic homopolymers, one or more polyolefinic copolymers, or mixtures of two or more thereof. By "copolymers" in this sense is meant any number of constituent polymer parts—so that bipolymers, terpolymers and copolymers of four or more constituent polymer parts are all included, for example. Both random and block copolymers are included in this definition, and the sealing layers may additionally or alternatively comprise blends of one or more homopolymers, copolymers or mixtures thereof. The sealing layer material for the sealing layers A and B may be the same or different.

The core layer is polyolefinic and may also comprise one or more homopolymers, one or more copolymers, or mixtures of two or more thereof. Preferably however, the core layer comprises a homopolymer, more preferably polypropylene, most preferably biaxially oriented polypropylene. The material of the core layer may however be blended with one or more further materials to select if desired additional or alternative functionality or aesthetics. It will be understood that the naked collation film may comprise additional layers as well as the hitherto identified core and sealing layers C, A and B. Such additional layers may for example include lamination layers, printable layers, UV barrier layers, oxygen permeability or barrier layers, water vapour permeability or barrier layers and the like. Such additional layers may be provided also by coextrusion, by post-coextrusion coating, by coextrusion coating or by combinations of two or more thereof.

The naked collation film may comprise, in its core layer and/or in one or more of its sealing layers and/or in any additional layer(s) functional materials for other purposes in relation to the functional or aesthetic characteristics of the film. Suitable functional materials may be selected from one or more of the following, mixtures thereof and/or combinations thereof: UV absorbers, dyes; pigments, colorants, metallised and/or pseudo-metallised coatings; lubricants, anti-static agents (cationic, anionic and/or non-ionic, e.g. [rho]oly-(oxyethylene) sorbitan monooleate), anti-oxidants (e.g. phosphorous acid, tris (2,4-di-tert-butyl phenyl)ester), surface-active agents, stiffening aids, slip aids (for example hot slips aids or cold slip aids which improve the ability of a film to slide satisfactorily across surfaces at about room temperature, e.g. micro-crystalline wax; gloss improvers, prodegradants, barrier coatings to alter the gas and/or moisture permeability properties of the film (such as polyvinylidene halides, e.g. PVdC); anti-blocking aids (for example microcrystalline wax, e.g. with an average particle size from about 0.1 to about 0.6 [mu]m); tack reducing additives (e.g. fumed silica, silica, silicone gum); particulate materials (e.g. talc); additives to increase COF (e.g. silicon carbide); additives to improve ink adhesion and/or printability, additives to increase stiffness (e.g. hydrocarbon resin); additives to increase shrinkage (e.g. hard resin).

Some or all of the additives listed above may be added together as a composition to coat the films of the present invention and/or form a new layer which may itself be coated and/or may form the outer or surface layer of the sheet. Alternatively, some or all of the preceding additives may be added separately and/or incorporated directly into the bulk of the core layer optionally during film formation (e.g. as part of the original polymer composition), and thus they may or may not form layers or coatings as such.

Films of the invention can also be made by the laminating of two co-extruded films. Application of the outer layer(s) onto the core layer is conveniently effected by any of the laminating or coating techniques conventionally employed in the production of composite multi-layer films. Preferably, however, one or more outer layers are applied to the substrate by a co-extrusion technique in which the polymeric components of the core and outer layers are co-extruded into intimate contact while each is still molten. Preferably the co-extrusion is effected from a multi channel annular die so designed that the molten polymeric components constituting individual layers of the composite film merge at their boundaries within the die to form a single composite structure which is then extruded from a common die orifice in the form of a tubular extrudate. It will be appreciated that any other shape of suitable die could also be used such as flat die.

The polymeric film can be made by any process known in the art, including, but not limited to, cast sheet, cast film, or blown film. This invention may be particularly applicable to films comprising cavitated or non-cavitated polypropylene films, with a block copolymer polypropylene/polyethylene core and skin layers with a thickness substantially below that of the core layer and formed for example from random co-polymers of ethylene and propylene or random terpolymers of propylene, ethylene and butylene. The film may comprise a biaxially orientated polypropylene (BOPP) film, which may be prepared as balanced films using substantially equal machine direction and transverse direction stretch ratios, or can be unbalanced, where the film is significantly more orientated in one direction (MD or TD). Sequential stretching can be used, in which heated rollers effect stretching of the film in the machine direction and a stenter oven is thereafter used to effect stretching in the transverse direction. Alternatively, simultaneous stretching, for example, using the so-called bubble process, or simultaneous draw stenter stretching may be used.

The films used in accordance with the present invention can be of a variety of thicknesses according to the application requirements. For example they can be from about 10 to about 240 μm thick, preferably from about 12 to 50 μm thick, and most preferably from about 15 to about 30 μm thick.

In a multi-layer film in accordance with the invention having at least a core layer, an inner sealing layer and an outer sealing layer, each sealing layer may independently have a thickness of from about 0.05 μm to about 2 μm, preferably from about 0.075 μm to about 1.5 μm, more preferably from about 0.1 μm to about 1.0 μm, most preferably from about 0.15 μm to about 0.5 nm. The inner and/or outer sealing layers may be ink printable, either inherently or with the aid of a suitable treatment, corona discharge treatment for example.

The invention is further illustrated by reference to the following examples, which are by way of illustration only, and are not limiting to the scope of the invention described herein.

EXAMPLES 1 to 8

Preparation of Film

A three layer polymeric tube was formed by coextruding a core layer (of polypropylene homopolymer with a layer of polyethylene/polypropylene/polybutylene terpolymer (a random copolymer) as a skin layer on both sides of the core layer. Prior to coextrusion the skin layer materials for the inner and outer layers were blended with further functional materials intended in accordance with the invention to provide selective sealability properties to the film. The tube was cooled and subsequently reheated before being blown to produce a three layer biaxially oriented film tube. The film tube was then spliced separated in opposite directions to form a three layer biaxially oriented film having an inner layer of the approximate thickness specified below, a core layer of approximately 23 to 24 μm thickness, and an outer layer of the approximate thickness specified below.

The film compositions are presented in Table 1:

TABLE 1

| | Sample Details | | |
|---|---|---|---|
| Example | Inner Coat | Outer Coat | Discharge Treatment |
| 1 | 0.17 μm thickness, comprising a compounded masterbatch containing Exact 0203* + 0.2% silica | 0.25 μm thickness, comprising a compounded masterbatch containing Exact 8203* + 0.5% silica + 0.5% silicone gum | Treated |
| 2 | 0.17 μm thickness, comprising a compounded masterbatch containing Exact 0203* + 0.2% silica | 0.25 μm thickness, comprising a compounded masterbatch containing Exact 8203* + 0.5% silica + 0.5% silicone gum | Non Treated |

TABLE 1-continued

Sample Details

| Example | Inner Coat | Outer Coat | Discharge Treatment |
|---|---|---|---|
| 3 | 0.35 μm thickness, comprising a physical blend of SPX78J3# + 0.04% silica + 0.175% silicone gum + 10% C600H2‡ | 0.25 μm thickness, comprising a physical blend of SPX78J3# + 0.1% silica | Treated |
| 4 | 0.35 μm thickness, comprising a physical blend of SPX78J3# + 0.04% silica + 0.175% silicone gum + 10% C600H2‡ | 0.25 μm thickness, comprising a physical blend of SPX78J3# + 0.1% silica | Non Treated |
| 5 | 0.25 μm thickness, comprising a compounded masterbatch of C600H2‡ + 1.75% silicone gum + 0.4% silica | 0.25 μm thickness, comprising a physical blend of SPX78J3# + 0.1% silica | Treated |
| 6 | 0.25 μm thickness, comprising a compounded masterbatch of C600H2‡ + 1.75% silicone gum + 0.4% silica | 0.25 μm thickness, comprising a physical blend of SPX78J3# + 0.1% silica | Non Treated |
| 7 | 0.25 μm thickness, comprising C600H2‡ | 0.25 μm thickness, comprising a physical blend of SPX78J3# + 0.1% silica | Treated |
| 8 | 0.25 μm thickness, comprising C600H2‡ | 0.25 μm thickness, comprising a physical blend of SPX78J3# + 0.1% silica | Non Treated |

*Exact 0203 and 8203 are octene-1 plastomers available from Dex Plastomers CBS-Weg 2, Heerlen, P.O. Box 6500, 6401 J H Heerlen, The Netherlands.
SPX78J-3 is a low seal threshold melt blend of a copolymer and a terpolymer available from Sumitomo Chemical Co. Ltd, 27-1, Shinkawa 2 - chome, Chuo-ku, Tokyo, 104-8260, Japan.
‡C600H2± is a propylene butylene copolymer supplied by Hyosung (Korea), Hyosung Bldg. 450 Gongdeok-dong, Mapo-gu, Seoul (121-720).

Certain mechanical and optical properties of the films were measured, with the following results:

TABLE 2

Optics

| | Gloss % (45°) | | Narrow Angle | Wide Angle |
|---|---|---|---|---|
| Example | IN | OUT | Haze (%) | Haze (%) |
| 1 | 98.5 | 98.2 | 2.8 | 1.5 |
| 2 | 89.3 | 83.9 | 2.0 | 3.3 |
| 3 | 99.8 | 99.0 | 2.1 | 1.1 |
| 4 | 100.4 | 100.4 | 2.0 | 1.6 |
| 5 | 91.2 | 85.9 | 2.5 | 2.8 |
| 6 | 92.3 | 85.7 | 1.9 | 3.0 |
| 7 | 98.5 | 97.9 | 2.2 | 1.4 |
| 8 | 99.5 | 99.5 | 2.0 | 1.6 |

TABLE 3

Coefficient of Friction
Samples were tested on the Messmer Slip Tester using the Clampmod method.

| Example | IN/IN | OUT/OUT | IN/OUT | IN/METAL | OUT/METAL |
|---|---|---|---|---|---|
| | | | Static | | |
| 1 | 0.39 | 0.53 | 0.36 | 0.32 | 0.30 |
| 2 | 0.29 | 0.43 | 0.31 | 0.21 | 0.23 |
| 3 | 0.57 | 0.56 | 0.47 | 0.52 | 0.41 |
| 4 | 0.45 | 0.50 | 0.46 | 0.28 | 0.28 |
| 5 | 0.40 | 0.55 | 0.44 | 0.32 | 0.37 |
| 6 | 0.28 | 0.41 | 0.30 | 0.21 | 0.24 |
| 7 | 0.53 | 0.56 | 0.57 | 0.50 | 0.37 |
| 8 | 0.49 | 0.52 | 0.54 | 0.27 | 0.28 |
| | | | Dynamic | | |
| 1 | 0.36 | 0.42 | 0.30 | 0.20 | 0.21 |
| 2 | 0.23 | 0.41 | 0.31 | 0.16 | 0.20 |
| 3 | 0.65 | 0.60 | 0.52 | 0.53 | 0.47 |
| 4 | 0.45 | 0.53 | 0.45 | 0.22 | 0.29 |
| 5 | 0.44 | 0.55 | 0.52 | 0.30 | 0.40 |
| 6 | 0.28 | 0.41 | 0.33 | 0.16 | 0.18 |
| 7 | 0.60 | 0.58 | 0.61 | 0.59 | 0.41 |
| 8 | 0.46 | 0.54 | 0.51 | 0.26 | 0.27 |

The sealing compatibility of the naked collation film of the invention to itself was investigated, with the following results.

TABLE 4

Heat Seal Threshold (g/25 mm)
Samples were sealed @ 5 psi for 0.2 second dwell metal/
rubber 10 (Bottom jaw off/top jaw 80° C.-130° C.).

| Example | 80° C. | 85° C. | 90° C. | 95° C. | 100° C. | 105° C. | 110° C. | 115° C. | 120° C. | 125° C. | 130° C. |
|---|---|---|---|---|---|---|---|---|---|---|---|
| IN/OUT | | | | | | | | | | | |
| 1 | 0 | 0 | 0 | 13 | 11 | 42 | 306 | 128 | 364 | 505 | 449 |
| 2 | 0 | 0 | 0 | 0 | 0 | 0 | 6 | 8 | 113 | 14 | 141 |
| 3 | 0 | 0 | 0 | 0 | 5 | 10 | 6 | 342 | 355 | 353 | 339 |
| 4 | 0 | 0 | 7 | 8 | 80 | 263 | 405 | 472 | 376 | 455 | 504 |
| 5 | 0 | 0 | 0 | 0 | 0 | 0 | 0 | 4 | 26 | 8 | 16 |
| 6 | 0 | 0 | 0 | 0 | 0 | 6 | 11 | 15 | 12 | 133 | 54 |
| 7 | 0 | 0 | 0 | 0 | 7 | 4 | 24 | 157 | 448 | 490 | 503 |
| 8 | 0 | 0 | 0 | 0 | 11 | 14 | 257 | 547 | 384 | 388 | 461 |
| OUT/OUT | | | | | | | | | | | |
| 1 | 7 | 20 | 30 | 87 | 100 | 200 | 179 | 221 | 257 | 261 | 290 |
| 2 | 0 | 0 | 4 | 10 | 35 | 174 | 368 | 438 | 360 | 466 | 399 |
| 3 | 0 | 3 | 4 | 4 | 15 | 13 | 24 | 238 | 321 | 445 | 423 |
| 4 | 0 | 0 | 5 | 20 | 126 | 353 | 394 | 467 | 431 | 375 | 406 |
| 5 | 0 | 2 | 3 | 4 | 5 | 5 | 8 | 261 | 295 | 241 | 505 |
| 6 | 0 | 0 | 2 | 3 | 35 | 38 | 160 | 263 | 326 | 294 | 460 |
| 7 | 0 | 0 | 2 | 4 | 4 | 5 | 93 | 356 | 306 | 353 | 263 |
| 8 | 0 | 0 | 3 | 9 | 97 | 366 | 448 | 427 | 408 | 403 | 470 |

To investigate the degree of incompatibility between the naked collation film of the invention and the film used on the unit wraps, heat seal thresholds were carried using the 'Hybrid' three film seal test. The inner seal of the naked collation film of the invention seal is tested against the outer off the unit wrap, with bottom jaw off. The unit wrap films selected for this test were GLS20, GLT20, and XLT20, all polyolefinic unit wrap films available from Innovia Films Ltd, Wigton, Cumbria.

TABLE 5

Hybrid Heat Seal Threshold
These tables show the out/in seal strength of the naked collation film and the strength of inner (naked collation) to outer of (unit wrap GLS20/GLT20/XLT20) for each variant.

| Example | 80° C. | 85° C. | 90° C. | 95° C. | 100° C. | 105° C. | 110° C. | 115° C. | 120° C. | 125° C. | 130° C. |
|---|---|---|---|---|---|---|---|---|---|---|---|
| OUT/IN ▶ GLS20 OUT | | | | | | | | | | | |
| EXAMPLE 1 Out/In | 0 | 0 | 0 | 0 | 6 | 68 | 193 | 268 | 334 | 340 | 407 |
| EXAMPLE 1 OUT/IN ▶GLS20 OUT | 0 | 0 | 0 | 0 | 0 | 0 | 1 | 0 | 28 | 24 | 11 |
| EXAMPLE 2 Out/In | 0 | 0 | 0 | 0 | 0 | 6 | 25 | 27 | 121 | 35 | 240 |
| EXAMPLE 2 OUT/IN ▶GLS20 OUT | 0 | 0 | 0 | 0 | 0 | 0 | 0 | 0 | 0 | 0 | 44 |
| EXAMPLE 3 Out/In | 0 | 0 | 0 | 0 | 2 | 7 | 20 | 270 | 350 | 341 | 385 |
| EXAMPLE 3 OUT/IN ▶GLS20 OUT | 0 | 0 | 0 | 0 | 0 | 0 | 0 | 19 | 46 | 92 | 20 |
| EXAMPLE 4 Out/In | 0 | 0 | 0 | 0 | 68 | 99 | 335 | 478 | 467 | 465 | 339 |
| EXAMPLE 4 OUT/IN ▶GLS20 OUT | 0 | 0 | 0 | 0 | 0 | 0 | 1 | 12 | 10 | 38 | 49 |
| EXAMPLE 5 Out/In | 0 | 0 | 0 | 0 | 0 | 2 | 5 | 5 | 4 | 12 | 12 |
| EXAMPLE 5 OUT/IN ▶GLS20 OUT | 0 | 0 | 0 | 0 | 0 | 0 | 0 | 0 | 0 | 0 | 0 |
| EXAMPLE 6 Out/In | 0 | 0 | 0 | 0 | 1 | 7 | 7 | 27 | 18 | 155 | 150 |

TABLE 5-continued

Hybrid Heat Seal Threshold
These tables show the out/in seal strength of the naked collation film and the strength of
inner (naked collation) to outer of (unit wrap GLS20/GLT20/XLT20) for each variant.

| Example | 80° C. | 85° C. | 90° C. | 95° C. | 100° C. | 105° C. | 110° C. | 115° C. | 120° C. | 125° C. | 130° C. |
|---|---|---|---|---|---|---|---|---|---|---|---|
| EXAMPLE 6 OUT/IN ▶GLS20 OUT | 0 | 0 | 0 | 0 | 0 | 0 | 0 | 0 | 0 | 0 | 0 |
| EXAMPLE 7 Out/In | 0 | 0 | 0 | 0 | 0 | 2 | 20 | 16 | 128 | 213 | 300 |
| EXAMPLE 7 OUT/IN ▶GLS20 OUT | 0 | 0 | 0 | 0 | 0 | 0 | 0 | 0 | 0 | 17 | 96 |
| EXAMPLE 8 Out/In | 0 | 0 | 0 | 2 | 7 | 22 | 66 | 308 | 467 | 447 | 343 |
| EXAMPLE 8 OUT/IN ▶GLS20 OUT | 0 | 0 | 0 | 0 | 0 | 0 | 0 | 0 | 0 | 16 | 59 |
| OUT/IN ▶GLT20 OUT | | | | | | | | | | | |
| EXAMPLE 1 Out/In | 0 | 0 | 0 | 0 | 5 | 95 | 184 | 215 | 264 | 247 | 297 |
| EXAMPLE 1 OUT/IN ▶GLT20 OUT | 0 | 0 | 0 | 0 | 0 | 0 | 0 | 0 | 0 | 0 | 7 |
| EXAMPLE 2 Out/In | 0 | 0 | 0 | 0 | 0 | 2 | 17 | 81 | 47 | 102 | 23 |
| EXAMPLE 2 OUT/IN ▶GLT20 OUT | 0 | 0 | 0 | 0 | 0 | 0 | 0 | 0 | 0 | 0 | 0 |
| EXAMPLE 3 Out/In | 0 | 0 | 0 | 0 | 4 | 15 | 5 | 119 | 99 | 36 | 216 |
| EXAMPLE 3 OUT/IN ▶GLT20 OUT | 0 | 0 | 0 | 0 | 0 | 0 | 0 | 9 | 9 | 11 | 16 |
| EXAMPLE 4 Out/In | 0 | 0 | 0 | 0 | 60 | 409 | 483 | 441 | 449 | 494 | 451 |
| EXAMPLE 4 OUT/IN ▶GLT20 OUT | 0 | 0 | 0 | 0 | 0 | 9 | 3 | 9 | 27 | 24 | 96 |
| EXAMPLE 5 Out/In | 0 | 0 | 0 | 0 | 0 | 0 | 2 | 3 | 4 | 27 | 12 |
| EXAMPLE 5 OUT/IN ▶GLT20 OUT | 0 | 0 | 0 | 0 | 0 | 0 | 0 | 0 | 0 | 0 | 0 |
| EXAMPLE 6 Out/In | 0 | 0 | 0 | 0 | 0 | 5 | 14 | 131 | 48 | 21 | 81 |
| EXAMPLE 6 OUT/IN ▶GLT20 OUT | 0 | 0 | 0 | 0 | 0 | 0 | 0 | 0 | 0 | 0 | 0 |
| EXAMPLE 7 Out/In | 0 | 0 | 0 | 0 | 4 | 3 | 142 | 11 | 132 | 57 | 53 |
| EXAMPLE 7 OUT/IN ▶GLT20 OUT | 0 | 0 | 0 | 0 | 0 | 0 | 0 | 0 | 8 | 4 | 9 |
| EXAMPLE 8 Out/In | 0 | 0 | 0 | 2 | 8 | 141 | 331 | 349 | 354 | 158 | 454 |
| EXAMPLE 8 OUT/IN ▶GLT20 OUT | 0 | 0 | 0 | 0 | 0 | 0 | 0 | 0 | 6 | 15 | 17 |
| OUT/IN ▶XLT20 OUT | | | | | | | | | | | |
| EXAMPLE 1 Out/In | 0 | 0 | 0 | 3 | 8 | 34 | 139 | 213 | 289 | 312 | 325 |
| EXAMPLE 1 OUT/IN ▶XLT20 OUT | 0 | 0 | 0 | 0 | 0 | 0 | 0 | 0 | 0 | 1 | 3 |

TABLE 5-continued

Hybrid Heat Seal Threshold
These tables show the out/in seal strength of the naked collation film and the strength of inner (naked collation) to outer of (unit wrap GLS20/GLT20/XLT20) for each variant.

| Example | 80° C. | 85° C. | 90° C. | 95° C. | 100° C. | 105° C. | 110° C. | 115° C. | 120° C. | 125° C. | 130° C. |
|---|---|---|---|---|---|---|---|---|---|---|---|
| EXAMPLE 2 Out/In | 0 | 0 | 0 | 0 | 2 | 7 | 34 | 29 | 14 | 11 | 26 |
| EXAMPLE 2 OUT/IN ▶XLT20 OUT | 0 | 0 | 0 | 0 | 0 | 0 | 0 | 0 | 0 | 0 | 0 |
| EXAMPLE 3 Out/In | 0 | 0 | 0 | 3 | 4 | 50 | 9 | 123 | 287 | 269 | 208 |
| EXAMPLE 3 OUT/IN ▶XLT20 OUT | 0 | 0 | 0 | 0 | 0 | 0 | 0 | 94 | 26 | 16 | 70 |
| EXAMPLE 4 Out/In | 0 | 3 | 8 | 19 | 125 | 395 | 342 | 393 | 406 | 364 | 483 |
| EXAMPLE 4 OUT/IN ▶XLT20 OUT | 0 | 0 | 0 | 0 | 0 | 0 | 0 | 9 | 10 | 27 | 169 |
| EXAMPLE 5 Out/In | 0 | 0 | 0 | 0 | 2 | 1 | 2 | 4 | 7 | 7 | 7 |
| EXAMPLE 5 OUT/IN ▶XLT20 OUT | 0 | 0 | 0 | 0 | 0 | 0 | 0 | 0 | 0 | 0 | 0 |
| EXAMPLE 6 Out/In | 0 | 0 | 0 | 0 | 2 | 3 | 5 | 10 | 28 | 12 | 22 |
| EXAMPLE 6 OUT/IN ▶XLT20 OUT | 0 | 0 | 0 | 0 | 0 | 0 | 0 | 0 | 0 | 0 | 0 |
| EXAMPLE 7 Out/In | 0 | 0 | 0 | 0 | 2 | 4 | 4 | 213 | 90 | 32 | 43 |
| EXAMPLE 7 OUT/IN ▶XLT20 OUT | 0 | 0 | 0 | 0 | 0 | 0 | 0 | 0 | 5 | 2 | 9 |
| EXAMPLE 8 Out/In | 0 | 0 | 2 | 3 | 8 | 15 | 69 | 316 | 154 | 257 | 464 |
| EXAMPLE 8 OUT/IN ▶XLT20 OUT | 0 | 0 | 0 | 0 | 0 | 0 | 0 | 0 | 7 | 12 | 18 |

EXAMPLES 9 to 12

The films were prepared in the same manner as the films of Examples 1 to 8 and the film compositions are presented in Table 6:

TABLE 6

Sample Details

| Example | Inner Coat | Outer Coat | Discharge Treatment |
|---|---|---|---|
| 9 | 0.20 μm thickness, comprising a physical blend of SPX78J3 + 0.04% silica + 0.175% silicone gum + 10% C600H2 | 0.30 μm thickness, comprising a physical blend of SPX78J3# + 0.1% silica + 0.5% silicone gum | Non Treated |
| 10 | 0.20 μm thickness, comprising a physical blend of BP LL2640AC[1] LLDPE + 0.09% silica + 0.09% SILICONE GUM | 0.30 μm thickness, comprising a physical blend BP LL2640AC LLDPE + 0.09% silica + 0.09% silicone gum | Non Treated |
| 11 | 0.20 μm thickness, comprising XM7080[†]/Adsyl + 1.5% silicone + 0.4% silica | 0.30 μm thickness, comprising XM7080[†]/Adsyl + 1.5% silicone + 0.4% silica | Non Treated |
| 12 | 0.50 μm thickness, comprising XM7080[†]/Adsyl (50:50) | 0.50 μm thickness, comprising XM7080[†]/Adsyl (50:50) | Non Treated |

[1] a commercial grade of LLDPE supplied by BP (now Ineos), Belgium. N.V. Rue de Ransbeek, 310 B-112.0, Brussels.

[†] a random propylene ethylene butylene (terpolymer), supplied by Basell Polyolefins Company NV. Avenue J. Monnet 1, B-1348 Ottignes, Louvain-la-Neuve.

a metallocene catalysed propylene-ethylene co-polymer, supplied by Mitsui Chemicals Inc. Shiodome City Center, 5-2, Higashi-Shmbashi 1-chome, Minato-ku. Tokyo 105-7117, Japan.

Certain mechanical and optical properties of the films were measured, with the following results:

TABLE 7

| | Optics | | | |
|---|---|---|---|---|
| | Gloss % (45°) | | Narrow Angle | Wide Angle |
| Sample | IN | OUT | Haze (%) | Haze (%) |
| 9 | 98.5-100.2 | 98.5-100.3 | 0-1 | 0.9-1.1 |
| 10 | 102.3-104.5 | 103.8-105.2 | 0-1 | 0.9-1.0 |
| 11 | 95.4-96.4 | 95.1-96.4 | 1-2 | 2.0-2.2 |
| 12 | 96.6-97.7 | 97.6-98.6 | 6-7 | 1.4-1.4 |

TABLE 8

Coefficient of Friction
Samples were tested on the Messmer slip tester using the Clampmod method.

| EXAMPLE | IN/IN | OUT/OUT | IN/OUT |
|---|---|---|---|
| | Static | | |
| 9 | 0.45 | 0.37 | 0.34 |
| 10 | 0.62 | 0.54 | 0.43 |
| 11 | 0.29 | 0.25 | 0.27 |
| 12 | 0.15 | 0.18 | 0.16 |
| | Dynamic | | |
| 9 | 0.39 | 0.32 | 0.30 |
| 10 | 0.37 | 0.39 | 0.41 |
| 11 | 0.16 | 0.16 | 0.15 |
| 12 | 0.12 | 0.17 | 0.14 |

The sealing compatibility of the naked collation film of the invention to itself was investigated, with the following results.

TABLE 9

Heat Seal Threshold (g/25 mm)
Samples were sealed @ 5 psi for 0.2 second dwell metal/rubber (Bottom jaw off/top jaw 100° C.-140° C.)

| Example | 100° C. | 105° C. | 110° C. | 115° C. | 120° C. | 125° C. | 130° C. | 135° C. | 140° C. |
|---|---|---|---|---|---|---|---|---|---|
| | IN/IN | | | | | | | | |
| 9 | 0 | 0 | 0 | 96 | 101 | 399 | 339 | 349 | 360 |
| 10 | 0 | 281 | 342 | 337 | 366 | 437 | 352 | 412 | 342 |
| 11 | 0 | 0 | 112 | 181 | 146 | 189 | 184 | 233 | 302 |
| 12 | 234 | 279 | 322 | 371 | 386 | 369 | 383 | 433 | 402 |
| | OUT/OUT | | | | | | | | |
| 9 | 0 | 0 | 113 | 398 | 343 | 349 | 410 | 411 | 400 |
| 10 | 0 | 244 | 315 | 398 | 343 | 368 | 363 | 330 | 360 |
| 11 | 0 | 123 | 157 | 142 | 321 | 289 | 328 | 325 | 315 |
| 12 | 212 | 232 | 302 | 372 | 386 | 389 | 406 | 433 | 412 |
| | IN/OUT | | | | | | | | |
| 9 | 0 | 0 | 50 | 116 | 384 | 352 | 346 | 404 | 479 |
| 10 | 0 | 308 | 321 | 277 | 295 | 354 | 315 | 362 | 434 |
| 11 | 0 | 119 | 167 | 182 | 330 | 353 | 361 | 366 | 442 |
| 12 | 281 | 311 | 342 | 396 | 406 | 419 | 405 | 433 | 412 |

To investigate the degree of incompatibility between the naked collation film of the invention and the film used on the unit wraps, heat seal thresholds are carried are using the 'Hybrid' three film seal test. The inner seal of the naked collation film of the invention seal is tested against the outer off the unit wrap, with bottom jaw off. The unit wrap films selected for this test are GLS20, GLT20, and XLT20, all polyolefinic units wrap films available from Innovia Films Ltd, Wigton, Cumbria, and the films of Examples 9 to 12 are found to be sealingly incompatible with the unit wrap films.

What is claimed is:

1. A naked collation package comprising an arrangement of individual packages, individually packaged in a polyolefin filmic material, that are packed together in said naked collation package in a naked collation film, wherein the naked collation film comprises a sealable polyolefin film having a polyolefin core layer C, an polyolefin inner sealing layer A and a polyolefin outer sealing layer B, each of layers A, B, and C comprising polyolefin filmic material,
wherein the polyolefin filmic material of the inner sealing layer A is selected for sealing incompatibility with the polyolefin filmic material of the individual packages under a specified sealing condition, and the polyolefin filmic material of the outer sealing layer B is selected for sealing compatibility with B and for sealing compatibility with A under the specified sealing condition,
wherein an external surface of the polyolefin filmic material of the individual packages comprises at least one polyolefin component derived from a monomeric olefin having a carbon chain length x, and the polyolefin filmic material of the inner sealing layer A comprises at least one polyolefin component derived from a monomeric olefin having a carbon chain length y, y being different from x,
wherein the inner sealing layer and/or the outer sealing layer comprises a polyolefinic component having a low heat seal threshold such that the sealing layer comprising the polyolefinic component having a low heat seal threshold will seal to itself and/or to the other sealing layer of the naked collation film at a temperature of less than 135° C., and
wherein the specified sealing condition comprises conditions of elevated temperature and/or pressure and a dwell time for a sealing operation such that the sealing layer comprising the polyolefinic component having a low heat seal threshold seals to itself and/or to the other sealing layer of the naked collation film but is sealingly incompatible with the polyolefin filmic material of the individual packages.

2. The naked collation package according to claim 1, wherein the polymeric material of the inner sealing layer comprises at least one polyolefin component having a low heat seal threshold.

3. The naked collation package according to claim 1, wherein the polymeric material of the outer sealing layer comprises at least one polyolefin component having a low heat seal threshold.

4. The naked collation package according to claim 1, wherein the polyolefin material of the outer sealing layer B also comprises at least one polyolefin component derived from a monomeric olefin having a carbon chain length y.

5. The naked collation package according to claim 1, wherein both x and y are from 2 to 4.

6. The naked collation package according to claim 1, wherein the naked collation film has a thickness of from about 15 µm to about 30 µm.

7. The naked collation package according to claim 1, wherein the thickness of the inner and/or outer sealing layer is from about 0.05 µm to about 2 µm.

8. The naked collation package according to claim 1, wherein the core layer comprises a homopolymer.

9. The naked collation package according to claim 1, wherein the naked collation film further comprises a barrier layer.

10. The naked collation package according to claim 1, wherein the naked collation film comprises a biaxially orientated polypropylene (BOPP) film.

11. The naked collation package according to claim 1, wherein the naked collation film is a shrinkable naked collation film.

12. The naked collation package according to claim 1, wherein the sealing layer A and B are formed of the same or different materials.

13. The naked collation package according to claim 1, wherein the seal strength of the inner sealing layer of the naked collation film to itself and/or the outer sealing layer at the selected sealing condition is above 100 g/25 mm.

14. The naked collation package according to claim 1, wherein the seal strength of the inner sealing layer of the naked collation film to itself and/or the outer sealing layer at the selected sealing condition is above 400 g/25 mm.

15. The naked collation package according to claim 1, wherein the seal strength of the or each sealing layer of the naked collation film to itself and/or the other sealing layer of the naked collation film is at least 50 g/25 mm higher than the seal strength of the sealing layer to the polyolefin film material of the unit wraps.

16. The naked collation package according to claim 1, wherein the seal strength of the or each sealing layer of the naked collation film to itself and/or the other sealing layer of the naked collation film is at least 150 g/25 mm higher than the seal strength of the sealing layer to the polyolefin film material of the unit wraps.

17. The naked collation package according to claim 1, wherein the sealing condition comprises a condition of elevated temperature in the range of 80° C. to 200° C.

18. The naked collation package according to claim 1, wherein the sealing condition comprises a condition of elevated temperature in the range of 90° C. to 150° C.

19. The naked collation package according to claim 1, wherein the individual packages being arranged in an ordered configuration inside the package and with the naked collation film wrapped around the ordered configuration of individual packages and sealed to itself at a girth seal, and sealed to itself at the envelope seal at each end of the package.

20. The naked collation package according to claim 1, wherein there is no seal between the naked collation film and the filmic material of the individual packages.

21. A naked collation package comprising an arrangement of individual packages, individually packaged in a polyolefin filmic material that are packed together in said naked collation package in a naked collation film,
    wherein the naked collation film comprises a sealable polyolefin film having a polyolefin core layer C, an polyolefin inner sealing layer A and a polyolefin outer sealing layer B, each of layers A, B, and C comprising polyolefin filmic material,
    wherein an external surface of the polyolefin filmic material of the individual packages comprises at least one polyolefin component derived from a monomeric olefin having a carbon chain length x, and the polyolefin filmic material of the inner sealing layer A comprises at least one polyolefin component derived from a monomeric olefin having a carbon chain length y, y being different from x,
    wherein the inner sealing layer and/or the outer sealing layer comprises a polyolefinic component having a low heat seal threshold such that the sealing layer comprising the polyolefinic component having a low heat seal threshold will seal to itself and/or to the other sealing layer of the naked collation film at a temperature of less than 135° C.,
    wherein the naked collation film is not sealed to the polyolefin filmic materials of the individual packages, and
    wherein the package has been formed by sealing the naked collation film to itself under elevated temperature such that the sealing layer comprising the polyolefinic component having a low heat seal threshold seals to itself and/or to the other sealing layer of the naked collation film but is sealingly incompatible with the polyolefin filmic material of the individual packages.

* * * * *